(12) United States Patent
Cermak et al.

(10) Patent No.: US 8,925,929 B2
(45) Date of Patent: Jan. 6, 2015

(54) SEALING ELEMENT FOR A CONSTANT VELOCITY JOINT AND CONSTANT VELOCITY JOINT ASSEMBLY

(75) Inventors: Herbert Cermak, Bessenbach (DE); Michael Zierz, Freiensteinau (DE)

(73) Assignee: GKN Driveline Deutschland GmbH, Offenbach (DE)

(*) Notice: Subject to any disclaimer, the term of this patent is extended or adjusted under 35 U.S.C. 154(b) by 0 days.

(21) Appl. No.: 13/989,750

(22) PCT Filed: Nov. 25, 2011

(86) PCT No.: PCT/EP2011/071024
§ 371 (c)(1),
(2), (4) Date: May 31, 2013

(87) PCT Pub. No.: WO2012/069628
PCT Pub. Date: May 31, 2012

(65) Prior Publication Data
US 2013/0252743 A1    Sep. 26, 2013

(30) Foreign Application Priority Data
Nov. 26, 2010    (DE) .......................... 10 2010 060 844

(51) Int. Cl.
*F16J 15/02* (2006.01)
*F16D 3/84* (2006.01)
*F16D 3/223* (2011.01)
*F16J 15/16* (2006.01)

(52) U.S. Cl.
CPC *F16D 3/84* (2013.01); *F16D 3/223* (2013.01); *F16D 3/845* (2013.01); *F16J 15/16* (2013.01); *F16D 2003/22316* (2013.01); *Y10S 464/906* (2013.01)

USPC .............................. 277/647; 464/15; 464/906

(58) Field of Classification Search
USPC ............. 464/15, 173, 906; 277/635, 644, 647
See application file for complete search history.

(56) References Cited

U.S. PATENT DOCUMENTS

| 3,611,816 | A | 10/1971 | Wedekind et al. |
| 6,502,831 | B2* | 1/2003 | Jarrus ........................... 277/635 |
| 7,252,616 | B2* | 8/2007 | Wormsbaecher ........... 464/15 X |

(Continued)

FOREIGN PATENT DOCUMENTS

| DE | 1625974 A1 | 8/1970 |
| DE | 2714983 A1 | 10/1978 |

(Continued)

OTHER PUBLICATIONS

Merriam-Webster's Collegiate Dictionary, p. 996, 1998.*

(Continued)

*Primary Examiner* — Gregory Binda
(74) *Attorney, Agent, or Firm* — Bejin Bieneman PLC

(57) ABSTRACT

A sealing element for sealing a joint chamber of a constant velocity joint is disclosed. The sealing element comprises an inner collar for providing a sealing connection relative to an inner joint part of the constant velocity joint, an outer collar for providing a sealing connection relative to an outer joint part of the constant velocity joint, and a membrane portion which extends between the inner collar and the outer collar. The membrane portion between the inner collar and the outer collar is fold-free and substantially conical in shape. A joint assembly having a constant velocity joint and a sealing element is also disclosed.

11 Claims, 5 Drawing Sheets

(56) References Cited

U.S. PATENT DOCUMENTS

| | | |
|---|---|---|
| 2007/0191121 A1 | 8/2007 | Zierz et al. |
| 2009/0124397 A1 | 5/2009 | Pallante |
| 2009/0160136 A1 | 6/2009 | LaMothe et al. |

FOREIGN PATENT DOCUMENTS

| | | |
|---|---|---|
| DE | 102006006441 A1 | 8/2007 |
| FR | 1233693 A | 10/1960 |
| JP | 07158656 A | 6/1995 |
| WO | WO-2006081393 A2 | 8/2006 |
| WO | WO-2007025170 A2 | 3/2007 |
| WO | WO-2009002335 A1 | 12/2008 |

OTHER PUBLICATIONS

PCT International Search Report dated Jan. 27, 2012 for PCT/EP2011/071024.

* cited by examiner

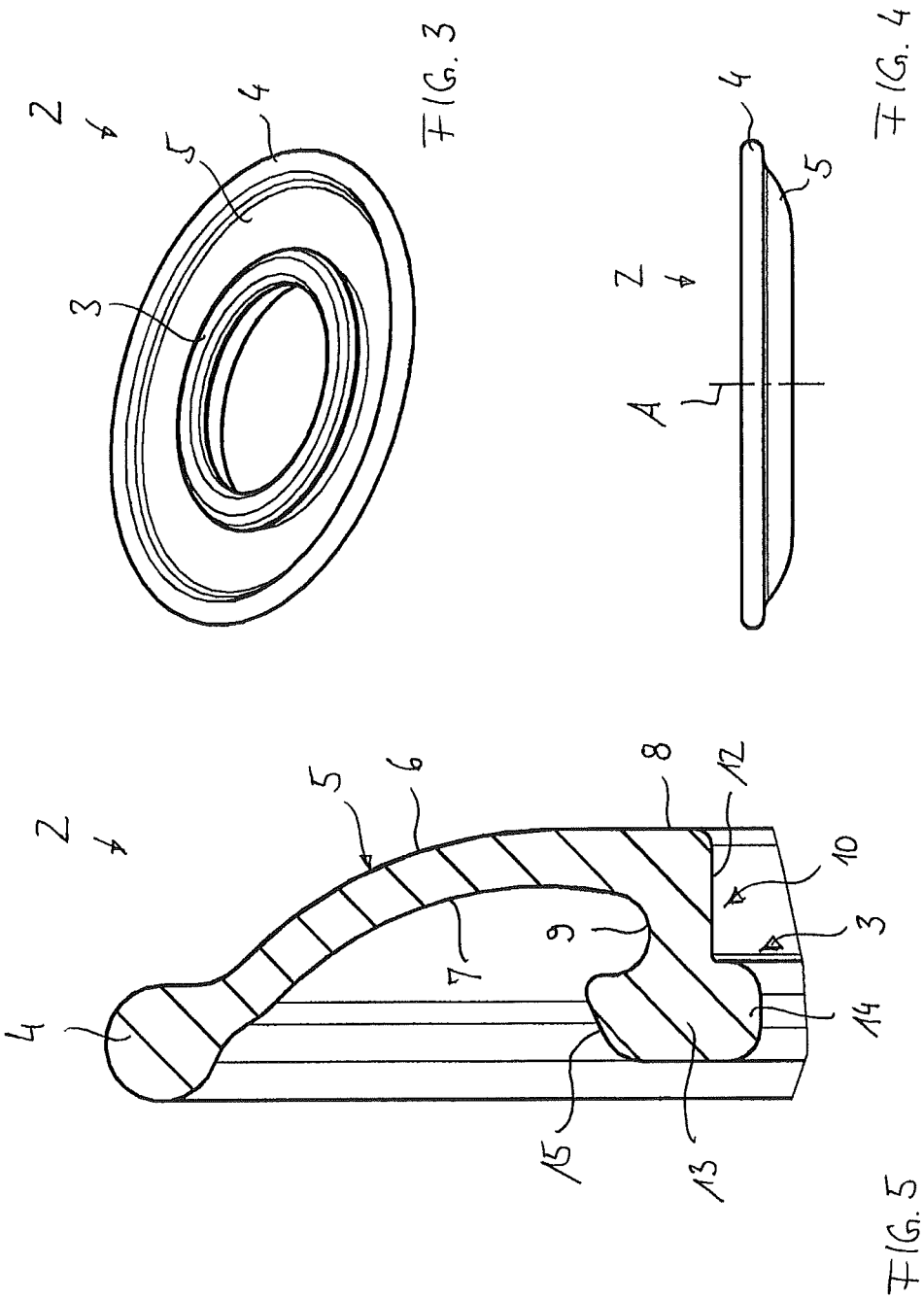

SEALING ELEMENT FOR A CONSTANT VELOCITY JOINT AND CONSTANT VELOCITY JOINT ASSEMBLY

CROSS REFERENCE TO RELATED APPLICATIONS

This application is a National Phase of International Application No. PCT/EP2011/071024, filed on Nov. 25, 2011, which claims priority to German Application No. 10 2010 060 844.0, filed on Nov. 26, 2010, which applications are hereby incorporated by reference in their entirety.

TECHNICAL FIELD

The disclosure relates to a sealing element for a constant velocity joint, as well as a constant velocity joint assembly comprising such a constant velocity joint, and a sealing element for sealing a joint chamber within the constant velocity joint.

BACKGROUND

From DE 10 2006 006 441 A1 there is known a joint assembly with sealing means which comprises a constant velocity joint and a sealing membrane. The constant velocity joint comprises an outer joint part, an inner joint part, torque transmitting balls which are guided in ball tracks of the outer joint part and of the inner joint, as well as a ball cage in which the balls are held. The sealing membrane comprises an inner collar which is firmly connected to a sleeve at the inner joint part, as well as an outer collar which is firmly connected to an annular cap at the outer joint part. The sealing membrane comprises an annular fold between the inner collar and the outer collar.

The sealing elements in constant velocity joints, more particularly in propeller shafts of motor vehicles, are subjected to extreme conditions, above all high rotational speeds and high temperatures, with the seals suffering deformations which can leads to a reduced service life of the seal and thus of the constant velocity joint.

SUMMARY

What is needed, however, is a sealing element for a constant velocity joint, which sealing element, even under extreme operational conditions, is characterized by a small amount of wear and thus by a prolonged service life. Furthermore, there is a need for a constant velocity joint assembly with such a sealing element, which assembly features a small amount of wear and a prolonged service life.

A sealing element for sealing a joint chamber of a constant velocity joint is disclosed. The sealing element comprises an inner first collar for providing a sealing connection relative to an inner joint part of the constant velocity joint, a second collar for providing a sealing connection relative to an outer joint part of the constant velocity joint, and a membrane portion which extends between the inner collar and the outer collar. The membrane portion between the inner collar and the outer collar is fold-free and substantially conical in shape.

When built into a constant velocity joint, the sealing element can advantageously experience a change in shape when the joint is in operation. The sealing element is designed such that a deformation potential is specifically provided in the sealing element with an objective of achieving an optimum end shape under operational conditions of the joint. In order to achieve a desired end shape, the original shape of the boot is such that, in its membrane portion between the inner collar and the outer collar, the boot is fold-free. "Fold-free" in the context of this application means that the membrane portion, if viewed in half a longitudinal section, from the outer collar towards the inner collar comprises a gradient which is greater than or equal to zero. In other words, the membrane portion does not contain a partial region with a negative gradient, i.e. in its initial state, it does not contain a fold. Between the outer collar and the inner collar, the membrane portion is substantially conical in shape, which has to be understood such that the membrane portion, if viewed in half a longitudinal section, can comprise a straight wall or a slightly curved wall. In other words, the conical, respectively substantially conical form of the membrane portion, is meant to include a tapered, bulged or dished form, having a positive gradient in an axial direction from the radial outside to the radial inside.

According to an exemplary embodiment, the sealing element is provided in the form of a membrane boot. The membrane portion is may be curved and may comprise a convex inner face and a concave outer face wherein the convex inner face, radially inside, forms an end face of the inner collar and wherein the concave outer face, radially inside, changes into an annular recess. The end face of the inner collar can serve as a contact face which can be axially supported against an end face of the inner joint part. The annular recess serves to accommodate a securing ring which, for the purpose of fixing the sealing element, can engage the recess form-fittingly.

From the inner collar to the outer collar, the membrane portion extends approximately C-shaped, with an axial distance between the membrane portion and a plane, which is defined by an end face of the inner collar facing the constant velocity joint, increases from radially inside to outside. This means that the end portion of the inner collar, which is radially adjoined by the membrane portion, is arranged so as to be axially offset relative to the outer bead. In the mounted condition, the end portion of the inner collar is axially closer to the joint than the outer collar. As a result of this design, the sealing element, in the starting condition overall, comprises an approximately annular-dish-like, respectively dished shape.

In one exemplary embodiment, the inner collar comprises a bead which, relative to a seat portion of the inner collar, projects radially outwardly and radially inwardly. The radially inwardly projecting bead portion has a fixing function relative to the inner joint part or to a sleeve-shaped projection firmly connected to the inner joint part. In the inner joint part or, respectively in the sleeve-shaped projection, there is provided an outer annular groove which can be engaged by the bead of the inner collar. By means of the outwardly projecting bead portion, an annular recess is formed on the outside of the inner collar, which recess can receive a securing ring in a form-fitting way. Thus, at high rotational speeds, and the resulting radially outwardly directed centrifugal forces, the outwardly projecting bead portion prevents the inner collar from undesirably being pulled through the securing ring. In an exemplary embodiment, the axial distance of the axial end face of the membrane portion relative to the inner bead is shorter than relative to the outer bead, which means that the inner bead is axially offset relative to the outer bead towards the end face and the joint respectively.

Furthermore, the present disclosure also provides for use of an inventive sealing element for sealing a joint chamber of a constant velocity joint, which sealing element can be provided in any one or several of the above-mentioned embodiments, wherein the inner collar is sealingly connectable to an inner joint part of the constant velocity joint and wherein the second collar is sealingly connectable to an outer joint part of the constant velocity joint. This results in the above-mentioned advantages that the sealing element, under operational conditions, assumes a defined shape which ensures a long service life of the sealing element and thus of the constant velocity joint.

In addition, a constant velocity joint assembly is proposed that comprises a constant velocity joint with a joint chamber wherein the joint chamber is sealed towards the outside and is at least partially filled with a lubricant; a sealing assembly with an inventive elastic sealing element for sealing the joint chamber; wherein the volume of the lubricant is configured such that, in the initial state, a force is applied by the lubricant from the inside of the joint chamber to the sealing element. This refers to the original condition of the joint assembly and of the sealing element, respectively, when carrying out the first rotation of the constant velocity joint.

It is appreciated that the sealing element for the inventive constant velocity joint assembly can comprise any one or several of the above-mentioned embodiments. The advantage is that the constant velocity joint assembly is subject to only a small amount of wear and thus comprises a long service life. The shape of the sealing element is such that, when the joint is operated, there occurs an irreversible plastic deformation, with at least part of the membrane portion being plastically deformed outwardly relative to the joint chamber. As a result of this change in shape, the joint chamber is increased in size, so that both the lubricant pressure and the flexing process in the lubricant are reduced. In this connection "at least part of the membrane portion" refers to at least a partial region of the membrane portion being plastically deformed.

When the joint is being run in, the internal pressure in the joint chamber is increased due to the effective centrifugal forces and increased temperatures. Said increase in pressure in the joint chamber is compensated for by the change in the shape of the sealing element and the resulting increase in volume. The running-in temperature of the joint is high enough so that due to the pressure applied to the sealing element and due to the temperature, there occurs creeping of the material of the sealing element and thus permanent plastic deformation, with the running-in temperature more particularly ranging between 100° C. and 120° C. The change in shape ensures that the material thickness of the sealing element at least in a partial region of the membrane portion in the starting condition, i.e. in the first shape, is greater than after the running-in process and, respectively in the operating condition, i.e. in the second shape.

According to one exemplary embodiment, the volume of the lubricant filling is configured such that, in the starting condition, the lubricant level of the lubricant filling reaches a diameter which is smaller than an outer diameter of the ball cage, more particularly smaller than a pitch circle diameter (PCD) of the balls, and in one exemplary arrangement, preferably smaller than an inner diameter of the ball cage. The level of the lubricant filling is meant to refer to the filling level which occurs when the constant velocity joint rotates, in which case the lubricant is centrifuged radially outwardly due to centrifugal forces. Because the lubricant filling, in the original shape of the sealing element, comprises a diameter which at least corresponds to a greatest outer diameter of the ball cage, the lubricant, on said effective diameter, is able to apply an axial force to the sealing element in an advantageous way. Said axial force, together with the temperature occurring under operational conditions, causes the material of the sealing element to creep. In this way, the sealing element permanently changes its shape, with the fold-free original condition of the membrane portion being folded, so that the latter—after the running-in process—under operational conditions comprises at least one annular fold.

In one exemplary embodiment, the sealing element, in a starting condition, comprises a first shape in which the at least part of the membrane portion is arranged close to a central plane of the constant velocity joint. Said first shape is characterized in that the sealing element or the membrane portion, respectively, is fold-free between the inner and outer collar. After the running-in process and in the operational condition respectively, the sealing element assumes a second shape in which the at least part of the membrane portion is arranged further distant from the central plane. In the second shape, the membrane portion comprises at least one annular fold between the inner collar and the outer collar. As a result of the plastic change in shape from the first shape to the second shape, the lubricant level moves from a smaller diameter existing in the starting condition, in which the lubricant applies a force from the inside to the sealing element, to a greater diameter, so that there occurs a reduction in the effect of the lubricant pressure on the sealing element. This is the result of the smaller affected surface and, respectively of the change in the geometry of application of force on the sealing element.

According to an exemplary embodiment, the constant velocity joint comprises an outer joint part, an inner joint part, torque transmitting balls which are guided in pairs of opposed ball tracks between the outer joint part and the inner joint part for torque transmitting purposes, and a ball cage with cage windows in which the balls are held in an angle-bisecting plane.

In its mounted condition, the sealing element, by means of its inner collar, is positioned on the inner joint part or a sleeve projection firmly connected to the inner joint part, with the inner collar, by means of its radially inwardly directed bead, engaging a corresponding annular groove of the inner joint part or of the sleeve projection, respectively. The sleeve projection can be produced so as to be integral with the inner joint part or it can be firmly connected to same, for example by welding. The inner collar of the sealing element may be arranged with radial pretension on the seat of the inner joint part or the sleeve projection, respectively. This means that the inner collar of the sealing element, in its original condition, comprises an inner diameter which is smaller than an outer diameter of the inner joint part in the region of the seat for the inner collar. The radial pretension may be configured such that the sealing element, in the mounted condition, is subjected to an extension of 3% to 7%, and in one particular embodiment, approximately 5%, in the region of the inner collar.

According to another exemplary embodiment, there is provided a cap which, by means of a first end portion, can be firmly connected to the outer joint part and, at a second end portion comprises an inwardly opening annular groove which is engaged by the outer collar of the sealing element. For this purpose, the outer collar may be provided in the form of a radially outwardly directed bead which form-fittingly engages the annular groove. The cap comprises an annular contact face against which an outer partial portion of the membrane part is supported in the starting condition. In the starting condition, at the start of the running-in process, the membrane portion rests against the contact face of the cap which loads the sealing element away from the central joint plane. After the running-in process, i.e. when the sealing element has assumed is second shape and when an annular fold has been formed, the membrane portion, with its outer partial portion, is spaced further away from the annular contact face, at least from the end portion of same.

The quantity or volume of the lubricant is determined such that, after the running-in process, the level of the lubricant filling is located on a second diameter which is greater than a smallest inner diameter of the cap. Said embodiment ensures that, in the operating condition and due to the centrifugal forces, the lubricant presses axially against the radially inwardly pulled cap, but not against the resilient sealing element. In this way, the sealing element is prevented from being expanded further and from being pressed further away from the joint, which, in the worst case, could lead to an expansion and failure of the sealing element.

BRIEF DESCRIPTION OF THE DRAWINGS

Exemplary embodiments are shown in the drawings and will be described below.

FIG. 3 shows the sealing element according to FIG. 1 in a perspective view.

FIG. 4 shows the sealing element according to FIG. 1 in a side view.

FIG. 5 shows the sealing element according to FIG. 1 in half a longitudinal section in detail.

DETAILED DESCRIPTION

Figure 1:
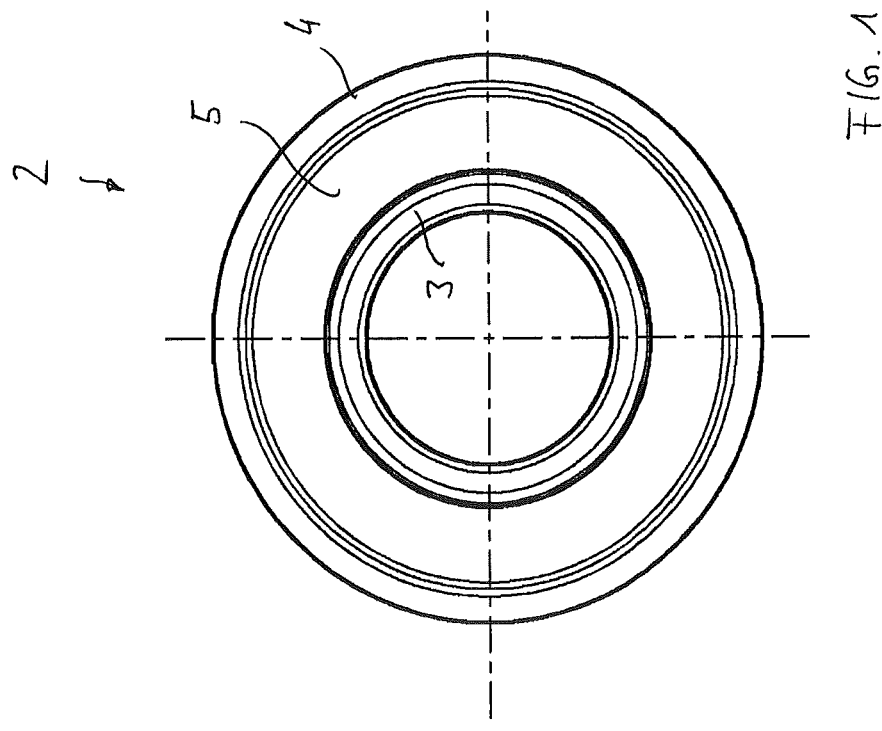
FIG. 1 is an inventive sealing element in a first embodiment in an axial view.
Figure 2:
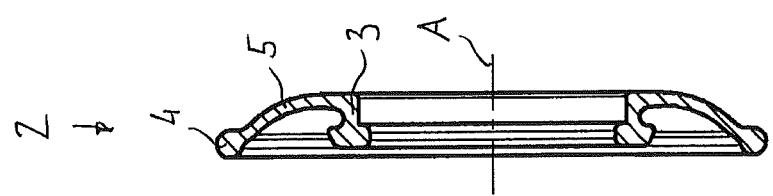
FIG. 2 shows the sealing element according to FIG. 1 in a longitudinal section.

FIGS. 1 to 5 will be described jointly below. They show an inventive sealing element 2 in a first embodiment which is provided in the form of a membrane boot. The sealing element 2 comprises an inner collar 3 to provide a sealing connection relative to an inner joint part or a component connected thereto; an outer collar 4 to provide a sealing connection relative to an outer joint part or a component connected thereto; as well as a membrane portion 5 which extends between the inner collar 3 and the outer collar 4 and connects same. The outer collar 4 is provided in the form of an annular bead which can sealingly engage a corresponding annular groove (not shown) in a form-fitting way. The outer collar 4 is seamlessly adjoined by the membrane portion 5.

It can be seen that the membrane portion 5, which can also be referred to as an intermediate portion, comprises a substantially conical shape rising from the radial outside to the radial inside with reference to the axis of rotation A. If viewed in half a longitudinal section, from the radial inside to the radial outside, the membrane portion 5 always comprises a gradient which is greater than or equal to zero. In the present embodiment, the membrane portion 5 is slightly curved, so that it comprises a convex inner face 6 and a concave outer face 7. Said curvature of the membrane portion from the outside to the inside is uniform along its entire radial extension, i.e. the membrane portion 5 is fold-free along its radial extension. On its radial inside, the convex inner face 6 changes into a radial end face 8 which forms a lateral boundary for the inner collar 3. On its radial inside, the concave outer face 7 changes into an annular recess 9 whose radius—in half a longitudinal section—is clearly smaller than the radius of the concave outer face 7. The recess 9 serves to accommodate a securing ring (not shown) which fixes the inner collar 3 on a sleeve component (not shown).

The inner collar 3 comprises a seat portion 10 including a cylindrical interface configured to sealingly contact a cylindrical outer face of an inner joint part seat portion 46 with radial pretension. The seat portion 10 comprises a more particularly cylindrical inner face 12 for sealingly resting on the sleeve component. The inner collar 3 includes an inner bead 13 which projects radially inwardly and radially outwardly relative to the seat portion 46. At its end opposite to the end face 8, the inner collar 3 comprises the bead 13 with a radially inwardly projecting first bead portion 14 and with a radially outwardly projecting second bead portion 15. The first bead portion 14 serves to engage a corresponding annular groove on the sleeve component. The radially outwardly extending bead portion 15 serves for axially fixing the securing ring in the recess 9. The outer face of the outer bead portion 15 is slightly conical, so that the securing ring (not shown) can easily be slid over the bead portion 15 until it snaps into the recess 9. Overall, the sealing element 2, if viewed in a longitudinal section, is approximately annular-dish-shaped, with the wall portion 5, if viewed in half a longitudinal section, being approximately C-shaped, respectively arc-shaped. The inner bead 13 is axially offset relative to the outer collar 4, i.e. towards the end face 8.

The shape of the inventive sealing element 2 is designed such that, when in the built-in condition in the joint, it can experience a change in shape. The membrane portion 5 which, in half a longitudinal section, is initially C-shaped and which, in the starting condition, is fold-less, in the running-in condition, is pushed away from a plane which is formed by the end face 8. In this way, the shape of the membrane portion 5 is changed, with the membrane portion 5 forming an annular fold between the inner collar 3 and the outer collar 4, which will be explained in greater detail below.

Figure 6:
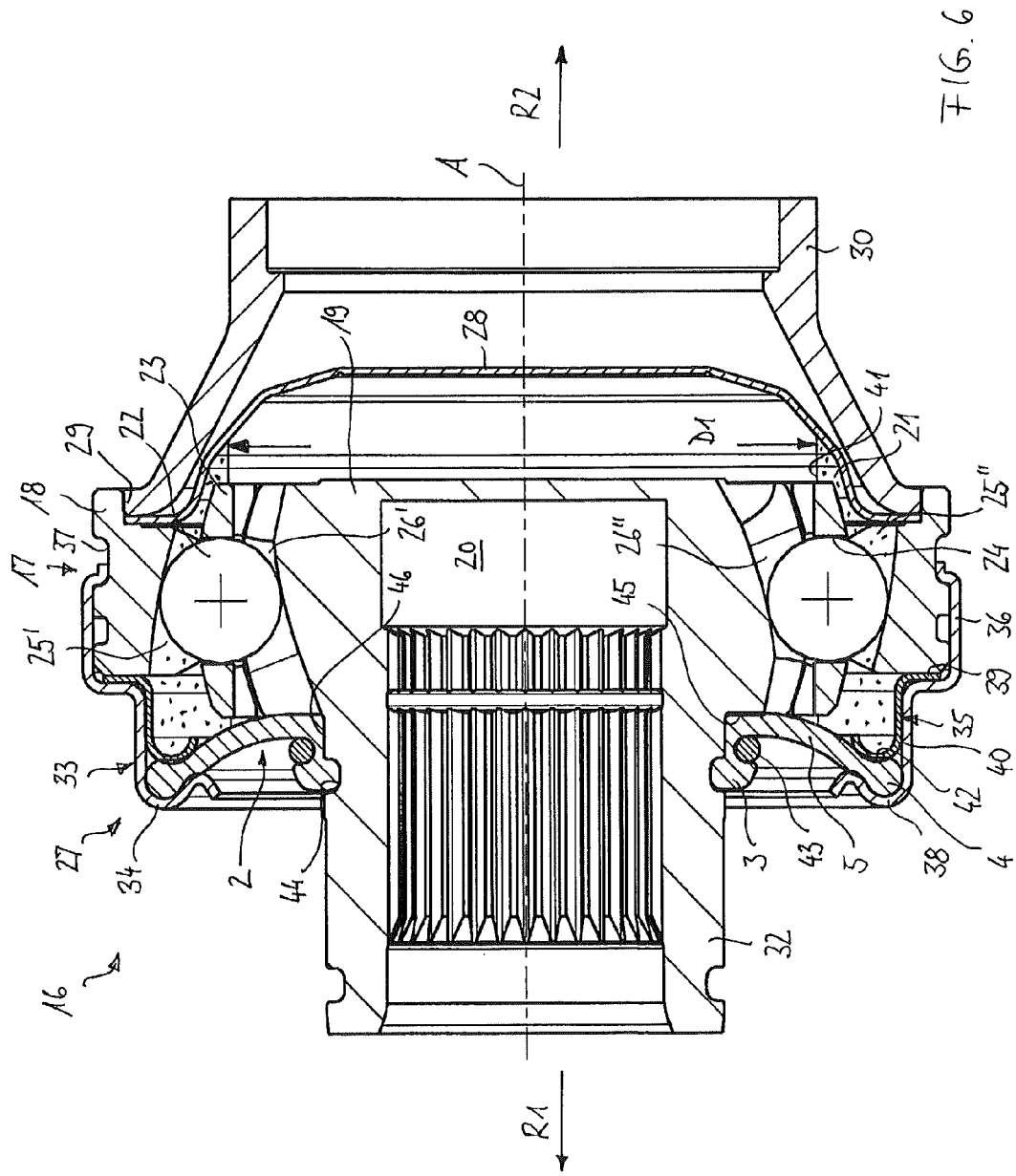
FIG. 6 shows an inventive joint assembly with an inventive sealing element according to FIG. 1 in a longitudinal section in the initial state, respectively starting condition.

FIG. 6 shows an inventive joint assembly 16 with an inventive sealing element 2, as shown in FIGS. 1 to 5. The joint assembly 16 comprises a constant velocity joint 17 with an outer joint part 18, an inner joint part 19 with an insertion opening 20 for inserting a shaft journal (not shown) in a torque-proof way, torque transmitting balls 22 and a ball cage 23 with cage windows 24 in which the balls 22 are held in a plane E. The opening 20 of the inner joint part 19 is designed as through-bore and comprises an internal spline which allows an axial plug-in connection with the shaft journal having a matching external spline. The constant velocity joint is provided in the form of a counter track joint, i.e. outer first ball tracks 25' in the outer joint part 18 and inner first ball tracks 26' in the inner joint part 19 extend axially in opposite directions relative to outer second ball tracks 25" in the outer joint part 18 and inner second ball tracks 26" in the inner joint part 19. The first pairs of tracks formed in this way comprise control angles which open in a first direction R1, whereas the second pairs of tracks comprise control angles which open in a second direction R2. The counter track formation is obtained in that the centers of curvature of the track center lines which extend parallel to the track base lines as illustrated and which alternate around the circumference in each of the joint parts 18, 19, are offset in opposed axial directions of the joint center plane E. The joint center plane E is defined by the centers of the balls 22 when the joint is in an aligned condition. The number of the torque transmitting balls 22 and of the cage windows 24 may amount to 6, 8, 10 or 12.

The counter track joint 17 is provided in the form of a disc joint, i.e. the outer joint part 18 is open in both directions R1, R2. In the first direction R1, the counter track joint 17 is sealed towards the outside by a sealing assembly 27. In the second direction R2, the counter track joint is sealed by a cover 28 which, because of an outer flange portion, is held in a recess 29 of the outer joint part 18. Furthermore, it is possible to provide a further cover (not shown) which is sealingly arranged in the insertion opening 20 of the inner joint part 19. A shaft tube 30 is connected by welding to the outer joint part 18, wherein a flange portion of the shaft tube 30 is inserted into the recess 29 of the outer joint part 18. The joint as shown, to that extent, is particularly suitable for being inserted into a one-part or multi-part drive-shaft. A sleeve 32 is integrally formed on to the inner joint part 19 which sleeve 32 serves to be connected to an attaching part, for example a journal of a driveshaft.

The sealing assembly 27 comprises an annular cap 33, the sealing element 2 and a securing ring 43. The annular cap 33 is provided in two parts and comprises a first cap part 34 and a second cap part 35. The two cap parts 34, 35 are preferably provided in the form of formed sheet metal parts. The outer cap part 34 comprises a fixing portion 36 which extends over the outer joint part 18 and, by means of an end portion, engages an annular groove 37 of the outer joint part 18. At its end opposed to the joint 17, the cap part 34 comprises an S-shaped portion 38 which forms an annular receiving space for the outer collar 4 of the sealing element 2. The second cap part 35 is arranged inside the first cap part 34 and comprises a flange portion 39 which is clamped in between the first cap part 34 and the outer joint part 18, as well as an adjoining cylindrical portion which is in planar contact with a corresponding cylindrical portion of the outer cap part 34, as well as an end portion 42 which is C-shaped in half a longitudinal section and which is open towards the joint. The C-shaped end portion 42 of the inner cap part 35 and the S-shaped end portion 38 of the outer cap part 34, jointly form an annular constriction with a reduced distance, as well as an annular space adjoining the constriction on the radial outside for receiving and fixing the outer collar 4 of the sealing element 2. A radially outer partial region of the membrane portion 5 is supported against the outer face of the C-shaped end portion 42 of the inner cap part 35.

The sealing element 2 is sealingly fixed on the sleeve 32 by a securing ring 43, with the annular bead 14 engaging an outer annular groove 44 of the sleeve 32, so that the inner collar 3 is axially fixed relative to the sleeve 32. To prevent the connection from being released under operational conditions, the securing ring 23 engages the recess 9 of the inner collar 3 of the sealing element 2. The inner collar 3 is thus also radially fixed relative to the sleeve 32. The inner collar 3 includes an end portion with the end face 8 configured to be axially supported against a face 45 of the inner joint part 19, wherein an axial distance between the inner face 8 of the inner collar 3 and the inner bead 13 is smaller than an axially distance between the end face 8 and the outer collar 4 such that, in a mounted condition, the end portion of the inner collar 3 is closer to the constant velocity joint than the outer collar 4.

The sleeve 32, which may be produced so as to be integral with the inner joint part 19, starting from the end face 45 of the inner joint part 19, comprises a seat portion 46 for the inner collar 3, which seat portion 46 is laterally delimited by the annular groove 44. The inner collar 3 of the sealing element 2 extends from the end face 45 of the inner joint part 19 to the end side of the annular groove 44.

FIG. 6 shows the inventive joint assembly 16 with the inventive sealing element 2 in the starting condition, i.e. in the original condition of the sealing element 2 following the production of same. It can be seen that, in this condition, the sealing element 2 comprises a membrane portion 5 which is approximately conical or arc-shaped and which, more particularly, is fold-free, as illustrated in FIGS. 1 to 5.

Immediately after the joint assembly 16 has been assembled, the situation is as shown in FIG. 6. As a result of the original shape of the sealing element 2, the joint chamber 31 is smaller than actually required. The sealing element 2 comprises a first shape which, basically, is disadvantageous for its service life, because between the sealing element 2 and the inner joint part 19 there occur disadvantageous contact and chafing faces, and the free movability of the sealing element 2 is limited. The lubricant filling for the joint is too large relative to the size of said joint chamber 31, so that the filling level 41 comprises a relatively small diameter D1. Thus, however, running-in conditions for the operating faces are achieved, which are advantageous for the service life of the joint.

Figure 7:
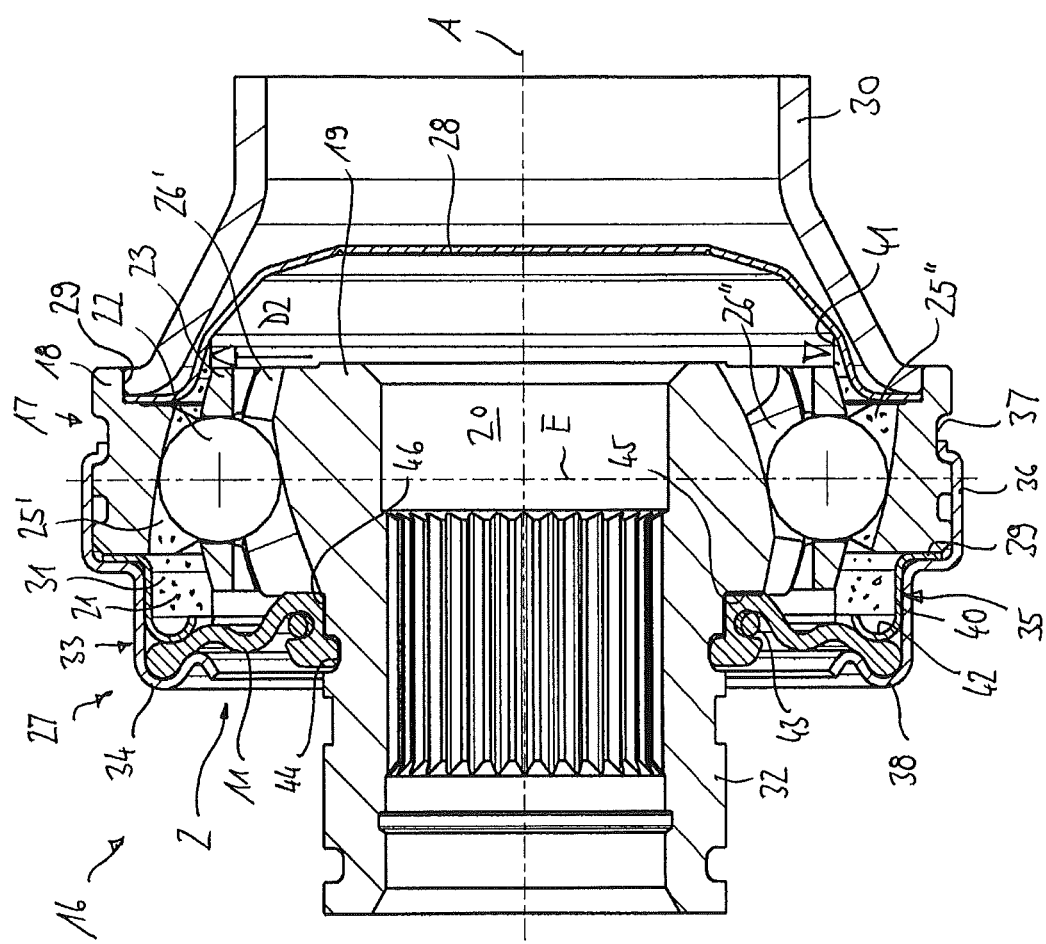
FIG. 7 shows the joint assembly according to FIG. 6 in a longitudinal section after the running-in process, in the operating condition.

If the joint 16 runs under operating conditions for some time, the sealing element 2 assumes its actual functional shape which is illustrated in FIG. 7. As a result, the contact faces as well as chafing and thus abrasion are reduced to a minimum and the degree of movability is increased. Thus, the service life of the sealing element is ensured. At the same time, the joint chamber 31 is increased, so that the lubricant level is increased radially outside. Consequently, both the lubricant pressure and lubricant flexing are reduced. Furthermore, an increase in pressure caused by increased temperatures in operation is compensated for by the increase in volume of the joint chamber 31 due to the change in shape of the sealing element 2.

It can be seen in FIG. 7, which shows the joint assembly 16 according to FIG. 6 after it has been run in and entered the operating condition, that the originally fold-less membrane portion 5 has changed its shape and, more particularly, has formed an annular fold. This means that the C-shaped form as seen in half a longitudinal section has changed into an S-shaped form. The reason for this change in shape is the constitution of the sealing element 2 under the influence of an axial force and of an increased temperature. While the joint assembly 16 is running in, the internal pressure in the joint chamber 31 increases due to the effective centrifugal forces and increased temperatures. Said increase in pressure in the inner joint chamber 31 leads to an irreversible plastic deformation of the sealing element 2 and, more particularly, of its membrane portion 5 which is loaded away from the central joint plane. As a result, the joint chamber 31 is increased, which, in turn, causes the level 41 of the lubricant 21 to acquire a greater diameter.

The volume or quantity of the lubricant filling has been calculated to be such that in the starting condition as illustrated in FIG. 6 the level 41 of the lubricant filling 21 has a diameter D1 which is smaller than the outer diameter of the ball cage 23. As a result of the plastic deformation of the sealing element 2 from the first shape as shown in FIG. 6 to the second shape as shown in FIG. 7, the level 41 of the lubricant 21 acquires a greater diameter D2. As a result, the lubricant pressure applied to the sealing element 2 is reduced. The quantity of the lubricant is calculated such that, after the running-in process, the level 41 of the lubricant filling 21 is on the second diameter D2, which is greater than a smallest inner diameter of the cap 33. In this way it is ensured that, as a result of the centrifugal forces, the lubricant 21 in the operating condition is pressed axially against a radially inwardly protruding portion of the cap 33, but not against the elastic sealing element 2. In this way, the sealing element 2 is prevented from being expanded further.

The running-in temperature of the joint assembly 16 is such that due to the pressure applied to the sealing element 2 and due to the temperature, the material is capable of creeping so that there takes place a permanent plastic deformation of the sealing element 2. The running-in temperature preferably ranges between 100° C. and 200° C.

Figure 8:
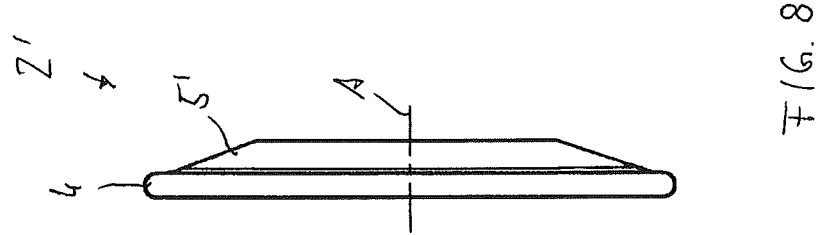
FIG. 8 shows a sealing element in a second embodiment in half a longitudinal section.
Figure 9:
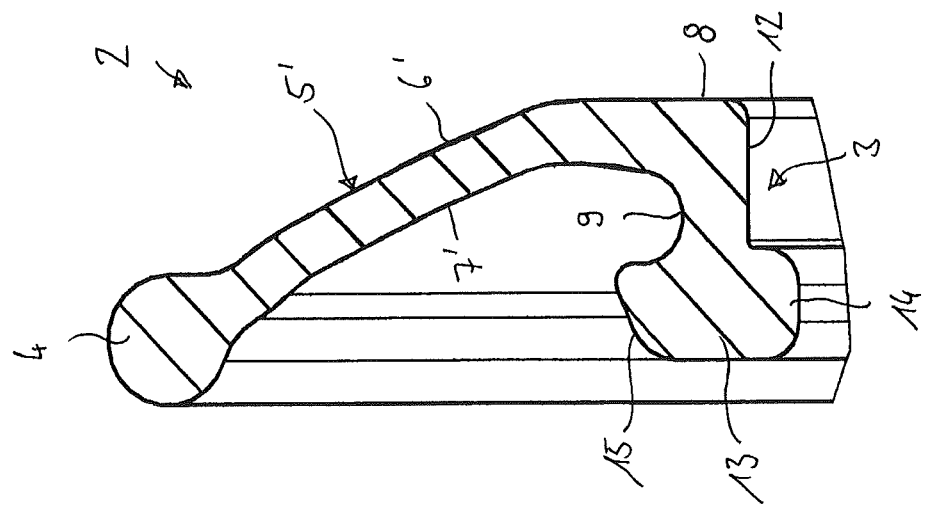
FIG. 9 shows the sealing element according to FIG. 8 in half a longitudinal section.

FIGS. 8 and 9, which will be described jointly below, show an inventive sealing element 2' in a second embodiment. In respect of design and mode of functioning, the sealing element 2' largely corresponds to that illustrated in FIGS. 1 to 5, so that, as far as common features are concerned, reference is made to the above description. Identical components have been given identical reference numbers and modified components have been given reference numbers provided with an apostrophe.

The only difference of the present sealing element 2' refers to the design of the membrane portion 5' which has a conical shape instead of a slightly curved shape. This sealing element 2', too, can be used in a joint assembly as shown in FIGS. 6 and 7. The shape of the sealing element 2' changes in operation, after the running-in process, as shown in FIG. 7 or is similar thereto. The sealing element 2', according to FIG. 9, thus has the same advantages as described above. It is appreciated that the inventive sealing element can also comprise contours of the membrane portion which deviate from those of the embodiments shown. For example, the sealing element, in its membrane portion, can have a shape which ranges, respectively extends, somewhere between that according to FIGS. 1 to 5 and that in FIG. 9.

The inventive sealing elements 2, 2' are advantageous in that in cooperation with the joint 17, when the latter is in operation, they can experience a change in shape. The final shape is achieved only under operational conditions of the joint 17, which shape is optimized in respect of the service life of the sealing element 2, 2'. In an advantageous way, this also results in a long service life for the entire joint assembly which is thus particularly suitable for being used under extreme operating conditions such as high rotational speeds or high temperatures.

The invention claimed is:

1. A sealing element for sealing a joint chamber of a constant velocity joint, comprising:
    an inner collar for providing a sealing connection relative to an inner joint part of the constant velocity joint, wherein the inner collar comprises a seat portion with a cylindrical interface configured to sealingly contact a cylindrical outer face of an inner joint part seat portion with radial pretension, wherein the inner collar further comprises an inner bead which projects radially inwardly and radially outwardly relative to said seat portion,
    an outer collar for providing a sealing connection relative to an outer joint part of the constant velocity joint,
    a membrane portion which extends between the inner collar and the outer collar, and
    wherein the membrane portion between the inner collar and the outer collar is fold-free and substantially conical in shape; and
    further wherein the inner collar comprises an end portion with an end face configured to be axially supported against a supporting face of the inner joint part, wherein an axial distance between said end face of said inner collar and the inner bead is smaller than an axial distance between said end face and the outer collar such that, in a mounted condition, the end portion of the inner collar is axially closer to the constant velocity joint than the outer collar.

2. A sealing element according to claim 1, wherein the membrane portion is curved and comprises a convex inner face and a concave outer face, wherein the convex inner face, radially inside, forms the end face of the inner collar and wherein the concave outer face, radially inside, changes into an annular recess.

3. A constant velocity joint assembly comprising:
    a constant velocity joint with an inner joint part, an outer joint part, torque transmitting balls, a ball cage, and a joint chamber, wherein the joint chamber is sealed towards the outside of the joint chamber and is at least partially filled with a lubricant,
    a sealing assembly with an elastic sealing element for sealing the joint chamber, wherein the elastic sealing element comprises an inner collar for providing a sealing connection relative to the inner joint part, an outer collar for providing a sealing connection relative to the outer joint part joint, and a membrane portion extending between the inner collar and the outer collar, wherein the membrane portion between the inner collar and the outer collar is fold-free and substantially conical in shape at least in an initial condition,
    wherein the inner collar comprises a seat portion with a cylindrical interface configured to sealingly contact a cylindrical outer face of an inner joint part seat portion with radial pretension, wherein the inner collar further comprises an inner bead which projects radially inwardly and radially outwardly relative to said seat portion,
    further wherein the inner collar comprises an end portion with an end face configured to be axially supported against a supporting face of the inner joint part, wherein an axial distance between said end face of said inner collar and the inner bead is smaller than an axial distance between said end face and the outer collar such that, in a mounted condition, the end portion of the inner collar is axially closer to the constant velocity joint than the outer collar,
    wherein the volume of the lubricant is measured to be such that, in the starting condition, when the constant velocity joint is first rotated, a lubricant level of the lubricant reaches a diameter which is smaller than an outer diameter of the ball cage such that a force is applied to the sealing element from the inside of the joint chamber.

4. A constant velocity joint assembly according to claim 3, wherein the volume of the lubricant is measured to be such that, in the starting condition, a lubricant level of the lubricant reaches a diameter which is smaller than a pitch circle diameter (PCD) of the torque transmitting balls.

5. A constant velocity joint assembly according to claim 3, wherein the sealing element is designed such that, as a result of the constant velocity joint being operated, at least part of the membrane portion is plastically deformable outwardly relative to the joint chamber.

6. A constant velocity joint assembly according to claim 3, wherein, in the initial condition, the sealing element assumes a first shape in which the at least part of the membrane portion is arranged close to a central plane (E) of the constant velocity joint and, after running-in, the sealing element assumes a second shape in which the at least part of the membrane portion is arranged at a further distance from the central plane (E).

7. A constant velocity joint assembly according to claim 3, wherein, after running-in, the membrane portion is no longer fold-free and comprises at least one annular fold between the inner collar and the outer collar.

8. A constant velocity joint assembly according to claim 3, wherein the torque transmitting balls are arranged in pairs of opposed ball tracks of the outer joint part and of the inner joint part.

9. A constant velocity joint assembly according to claim 3, wherein the radial pretension is configured such that, in its mounted condition, in a region of the inner collar, the sealing element is subjected to an elongation of 3 to 7%.

10. A constant velocity joint assembly according to claim 3, wherein there is provided a cap which, by a first end portion, is firmly connectable to the outer joint part and, at a second end portion, comprises an inwardly opening annular groove which is engaged by the outer collar of the sealing element, wherein the cap comprises an annular contact face which supports an outer partial portion of the membrane portion in the initial condition.

11. A constant velocity joint assembly according to claim 10, wherein a plastic deformation of the sealing element is such that, after running-in, the lubricant level of the lubricant reaches a second diameter which is greater than a smallest inner diameter of the cap.

\* \* \* \* \*